US009170719B2

(12) United States Patent
Akasaka et al.

(10) Patent No.: US 9,170,719 B2
(45) Date of Patent: Oct. 27, 2015

(54) INFORMATION PROCESSING DEVICE, METHOD FOR CONTROLLING INFORMATION PROCESSING DEVICE, AND RECORDING MEDIUM ON WHICH INFORMATION PROCESSING DEVICE CONTROL PROGRAM IS RECORDED

(71) Applicant: Sharp Kabushiki Kaisha, Osaka-shi, Osaka (JP)

(72) Inventors: Kohji Akasaka, Osaka (JP); Hiroshi Fukutomi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/359,622

(22) PCT Filed: Dec. 5, 2012

(86) PCT No.: PCT/JP2012/081530
§ 371 (c)(1),
(2) Date: May 21, 2014

(87) PCT Pub. No.: WO2013/094413
PCT Pub. Date: Jun. 27, 2013

(65) Prior Publication Data
US 2014/0344753 A1    Nov. 20, 2014

(30) Foreign Application Priority Data

Dec. 20, 2011    (JP) .................................. 2011-279047

(51) Int. Cl.
*G06F 3/048*    (2013.01)
*G06F 3/0484*    (2013.01)
(Continued)

(52) U.S. Cl.
CPC ............ *G06F 3/04842* (2013.01); *G06F 3/017* (2013.01); *G06F 3/0482* (2013.01); *G06F 3/0488* (2013.01); *G06F 2203/04101* (2013.01)

(58) Field of Classification Search
CPC . G06F 3/0481; G06F 3/04842; G06F 3/0488; G06F 3/0482; G06F 3/033
USPC .......................................................... 715/823
See application file for complete search history.

(56) References Cited

U.S. PATENT DOCUMENTS 5,995,101 A * 11/1999 Clark et al. .................... 715/711
6,211,856 B1    4/2001 Choi et al.
(Continued)

FOREIGN PATENT DOCUMENTS

JP    10-269022    10/1998
JP    2002-505783 A    2/2002
(Continued)

*Primary Examiner* — Nicholas Augustine
(74) *Attorney, Agent, or Firm* — Birch, Stewart, Kolasch & Birch, LLP

(57) ABSTRACT

A display device (1) includes: a sensor section (11) detecting a hover state; a position detecting section (33) for specifying a position in the hover state; a selection guide creating section (34) for detecting objects within a predetermined range from the position thus specified; a selection guide display processing section (35) for displaying pieces of object information corresponding to the objects thus detected; and an object processing section (36) for carrying out, when any of the pieces of object information is selected, the same process(es) as a process(es) that is/are to be carried out if an object(s) corresponding to the any of the pieces of object information is/are selected.

9 Claims, 10 Drawing Sheets

(51) Int. Cl.
*G06F 3/0488* (2013.01)
*G06F 3/01* (2006.01)
*G06F 3/0482* (2013.01)
*G06F 3/00* (2006.01)

(56) References Cited

U.S. PATENT DOCUMENTS

| | | | |
|---|---|---|---|
| 7,814,425 B1* | 10/2010 | O'Shaugnessy et al. | 715/752 |
| 8,121,902 B1* | 2/2012 | Desjardins et al. | 705/26.1 |
| 8,205,172 B2* | 6/2012 | Wong et al. | 715/855 |
| RE43,564 E | 8/2012 | Van Ee | |
| 2002/0030699 A1 | 3/2002 | Van Ee | |
| 2009/0021387 A1* | 1/2009 | Hosono | 340/686.1 |
| 2009/0327078 A1* | 12/2009 | Ohazama et al. | 705/14.54 |
| 2011/0113346 A1* | 5/2011 | O'Shaugnessy et al. | 715/752 |
| 2011/0213655 A1* | 9/2011 | Henkin et al. | 705/14.49 |
| 2012/0176398 A1* | 7/2012 | Takaoka et al. | 345/589 |
| 2013/0254308 A1* | 9/2013 | Rose et al. | 709/206 |

FOREIGN PATENT DOCUMENTS

| | | |
|---|---|---|
| JP | 2005-44026 A | 2/2005 |
| JP | 2006-309631 A | 11/2006 |
| JP | 2007-293511 A | 11/2007 |
| JP | 2008-77272 A | 4/2008 |
| JP | 2009-26155 A | 2/2009 |
| JP | 2010-108080 A | 5/2010 |
| JP | 2011-28451 A | 2/2011 |
| JP | 2011-70380 A | 4/2011 |
| JP | 2011-192173 A | 9/2011 |
| JP | 2011-526709 A | 10/2011 |
| JP | 2012-133523 A | 7/2012 |
| WO | WO 99/54807 A1 | 10/1999 |

* cited by examiner

FIG. 6
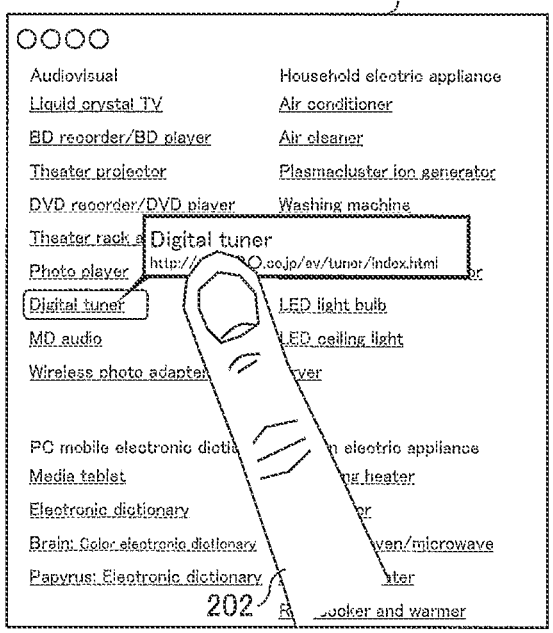
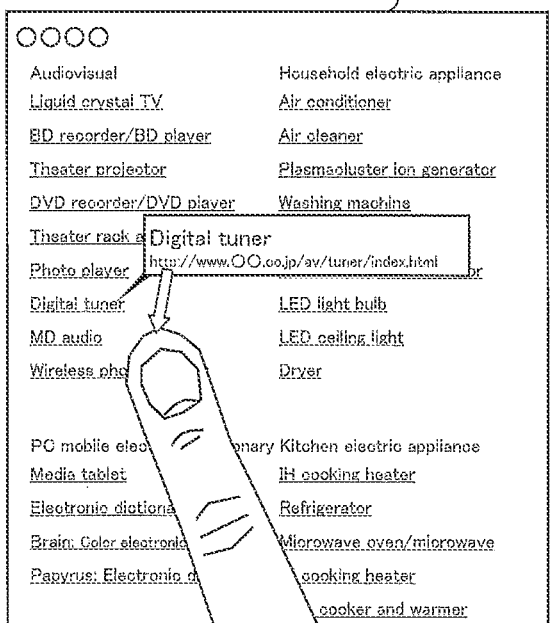

FIG. 12

```
┌─ 1201 ──────────────────────────────────────┐
│ ○○○○                                         │
│ Audiovisual              Household electric appliance │
│ Liquid crystal TV        Air conditioner    │
│ BD recorder/BD player    Air cleaner        │
│ Theater projector        Plasmacluster ion generator │
│ DVD recorder/DVD player  Washing machine    │
│ Theater rack audio       Vacuum cleaner     │
│ Photo player             Household LED illuminator │
│ Digital tuner            LED light bulb     │
│ MD audio                 LED ceiling light  │
│ Wireless photo adapter   Dryer              │
│                                              │
│ PC mobile electronic dictionary  Kitchen electric appliance │
│ Media tablet             IH cooking heater  │
│ Electronic dictionary    Refrigerator       │
│ Brain: Color electronic dictionary  Microwave oven/microwave │
│ Papyrus: Electronic dictionary   IH cooking heater │
│                          Rice cooker and warmer │
└──────────────────────────────────────────────┘
```

FIG. 13

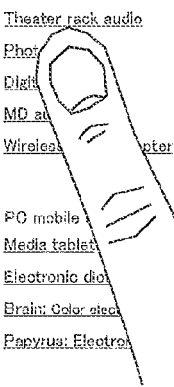

INFORMATION PROCESSING DEVICE, METHOD FOR CONTROLLING INFORMATION PROCESSING DEVICE, AND RECORDING MEDIUM ON WHICH INFORMATION PROCESSING DEVICE CONTROL PROGRAM IS RECORDED

TECHNICAL FIELD

The present invention relates to an information processing device in which a display surface serves as an operation receiving surface and which receives an operation via a touch to the operation receiving surface. In particular, the present invention relates to an information processing device capable of detecting a target near an operation screen, a method for controlling the information processing device, an information processing device control program, and a computer-readable recording medium in which the program is stored.

BACKGROUND ART

In recent years, a number of information processing devices including a touch screen on a display surface and configured to receive an operation via a touch to the display surface, like smartphones and tablets, have been developed for market. Touch screens can provide intuitive simple operations. Therefore, it is expected that information processing devices will increasingly employ such a touch screen in the future too.

Examples of the touch screens include resistive film touch screens, capacitive touch screens, and infrared touch screens etc. Of these, capacitive touch screens are capable of handling complex input operations such as "gestures" and thus are capable of handling multiple touch operations. Therefore, information devices including such a capacitive touch screen have become widespread.

Furthermore, there have been disclosed various methods of a display on a touch screen. For example, Patent Literature 1 discloses an information processing device which carries out a pop-up display on the basis of the touched position.

Furthermore, Patent Literature 2 discloses a menu displaying device which carries out a menu display on the basis of the size of a hand which touched the device.

Furthermore, Patent Literatures 3 and 4 each disclose a display device which displays an enlarged view of a touched position.

Furthermore, Patent Literature 5 discloses an input device in which display contents are moved as dragging is performed while still touching the input device.

Furthermore, Patent Literature 6 discloses an instruction executing device which highlights a touched object.

Furthermore, Patent Literature 7 discloses a touch screen which zooms in on a touched position.

CITATION LIST

Patent Literature 1
Japanese Patent Application Publication, Tokukai, No. 2011-192173 A (Publication Date: Sep. 29, 2011)
Patent Literature 2
Japanese Patent Application Publication, Tokukai, No. 2010-108080 A (Publication Date: May 13, 2010)
Patent Literature 3
Japanese Patent Application Publication, Tokukai, No. 2011-028451 A (Publication Date: Feb. 10, 2011)
Patent Literature 4
Japanese Patent Application Publication, Tokukai, No. 2008-077272 A (Publication Date: Apr. 3, 2008)
Patent Literature 5
Japanese Patent Application Publication, Tokukai, No. 2007-293511 A (Publication Date: Nov. 8, 2007)
Patent Literature 6
Japanese Patent Application Publication, Tokukai, No. 2005-044026 A (Publication Date: Feb. 17, 2005)
Patent Literature 7
Japanese Translation of PCT International Application Publication, Tokuhyo, No. 2002-505783 A (Publication Date: Feb. 19, 2002)

SUMMARY OF INVENTION

Technical Problem

However, since the touch screen is designed to operate by touching with a finger etc., it is often difficult to select a desired object if the desired object is small. In particular, in the case of a portable information device, it is not possible to increase the size of a display screen and thus displayed objects are likely to be small.

If objects are displayed small, the following adverse effect may occur: for example, an object different from the desired object is selected, and the operation needs to be carried out again.

Furthermore, in the case of touching with a finger etc., there may be a case in which a region including the desired object is covered by the finger and hidden from a user and thereby it is difficult for the user to select the desired object. This is discussed with reference to FIGS. 12 and 13. FIG. 12 illustrates an example in which some objects are displayed on a display section. For example, in a case where the object "digital tuner" is to be selected in the display example 1201 illustrated in FIG. 12, one way to do so is to touch the object with a finger as illustrated in a display example 1301 of FIG. 13. In this case, a plurality of objects including the desired object "digital tuner" are hidden under the finger. This makes it difficult to easily and unfailingly select the "digital tuner".

Also according to the inventions disclosed in Patent Literatures 1 through 7, it is also difficult to select the desired object in the case where objects are displayed small.

The present invention has been made in view of the above problems, and an object of the present invention is to realize an information processing device etc. which is to be operated by detecting a touch to a touch screen etc., and is configured such that it is possible to easily and unfailingly select a desired object.

Solution to Problem

In order to attain the object, an information processing device in accordance with the present invention is an information processing device configured to carry out a process(es) associated with a displayed object(s) selected from a plurality of displayed objects, said information processing device being configured to carry out the process(es) associated with the displayed object(s) upon detecting a touch to the displayed object(s) with an operation subject, said information processing device including: a detecting section for detecting a hover state in which the operation subject is not in contact with a display surface but is within a predetermined distance from the display surface; position specifying means for specifying, when the detecting section has detected the hover state, a position on the display surface which position is indicated by the operation subject thus detected; object detecting means for detecting a plurality of objects which are displayed within a predetermined range from the position specified by the position specifying means; object information display means for displaying pieces of object information corresponding to the respective plurality of objects detected by the object detecting means so that the pieces of object information are displayed in a more spread manner than the plurality of objects detected by the object detecting means; and object processing means for carrying out, upon detecting a touch to any of the pieces of object information displayed by the object information display means, the same process(es) as a process(es) that is/are to be carried out if an object(s) corresponding to the any of the pieces of object information is/are selected.

A method for controlling an information processing device in accordance with the present invention is a method for controlling an information processing device configured to carry out a process(es) associated with a displayed object(s) selected from a plurality of displayed objects, the information processing device being configured to carry out the process(es) associated with the displayed object(s) upon detecting a touch to the displayed object(s) with an operation subject, the information processing device including a detecting section for detecting a hover state in which the operation subject is not in contact with a display surface but is within a predetermined distance from the display surface, said method including the steps of: (a) specifying, when the detecting section has detected the hover state, a position on the display surface which position is indicated by the operation subject thus detected; (b) detecting a plurality of objects which are displayed within a predetermined range from the position specified in step (a); (c) displaying pieces of object information corresponding to the respective plurality of objects detected in step (b) so that the pieces of object information are displayed in a more spread manner than the plurality of objects detected in step (b); and (d) carrying out, upon detecting a touch to any of the pieces of object information displayed in step (c), the same process(es) as a process(es) that is/are to be carried out if an object(s) corresponding to the any of the pieces of object information is/are selected.

With the arrangement or the method, when the detecting section has detected the hover state of the operation subject, the pieces of object information corresponding to the respective plurality of objects displayed within the predetermined range from the position on the display surface which position is indicated by the operation subject are displayed.

The pieces of object information are displayed in a more spread manner than their corresponding plurality of objects, and, when a touch to any of the pieces of object information is detected, the same process(es) as a process(es) associated with an object(s) corresponding to the any of the pieces of object information is/are carried out.

With this arrangement, when the operation subject is in the hover state, pieces of object information corresponding to the objects near the hover position are displayed in a more spread manner than the objects. This allows a user to select a piece of object information corresponding to a desired object easily and unfailingly. In other words, it is possible for the user to select a piece of object information easily and unfailingly.

Accordingly, even in a case where small objects are displayed close together, it is possible to allow a user to select a desired object easily and unfailingly.

Note, here, that the predetermined range can be, for example, a range which is covered by a finger when the display surface is touched with the finger. Furthermore, the operation subject can be, for example, a user's finger or a stylus.

Advantageous Effects of Invention

As has been described, an information processing device in accordance with the present invention includes: a detecting section for detecting a hover state in which an operation subject is not in contact with a display surface but is within a predetermined distance from the display surface; position specifying means for specifying, when the detecting section has detected the hover state, a position on the display surface which position is closest to the operation subject thus detected; object detecting means for detecting a plurality of objects which are displayed within a predetermined range from the position specified by the position specifying means; object information display means for displaying pieces of object information corresponding to the respective plurality of objects detected by the object detecting means so that the pieces of object information do not overlap each other and also do not overlap their corresponding plurality of objects; and object processing means for carrying out, upon detecting a touch to any of the pieces of object information displayed by the object information display means, the same process(es) as a process(es) that is/are to be carried out if an object(s) corresponding to the any of the pieces of object information is/are selected.

A method for controlling an information processing device in accordance with the present invention is to control an information processing device including a detecting section for detecting a hover state in which an operation subject is not in contact with a display surface but is within a predetermined distance from the display surface, said method including the steps of: (a) specifying, when the detecting section has detected the hover state, a position on the display surface which position is closest to the operation subject thus detected; (b) detecting a plurality of objects which are displayed within a predetermined range from the position specified in step (a); (c) displaying pieces of object information corresponding to the respective plurality of objects detected in step (b) so that the pieces of object information do not overlap each other and also do not overlap their corresponding plurality of objects; and (d) carrying out, upon detecting a touch to any of the pieces of object information displayed in step (c), the same process(es) as a process(es) that is/are to be carried out if an object(s) corresponding to the any of the pieces of object information is/are selected.

With this arrangement, when the operation subject is in the hover state, pieces of object information corresponding to the objects near the hover position are displayed. This makes it possible to easily present to a user a piece of object information corresponding to a desired object. Furthermore, the pieces of object information do not overlap each other, and also do not overlap their corresponding objects. This allows the user to select a piece of object information easily and unfailingly.

Accordingly, even in the case where small objects are displayed close together, since pieces of object selection information are displayed, it is possible to cause a user to carry out a process associated with a desired object easily and unfailingly.

BRIEF DESCRIPTION OF DRAWINGS

FIG. 6 illustrates other examples of screens displayed on the display device.

FIG. 12, which describes a conventional technique, illustrates a state in which hyperlinked objects are displayed on a display section.

FIG. 13, which describes the conventional technique, illustrates a state in which an object displayed on the display section is to be selected.

DESCRIPTION OF EMBODIMENTS (Overview of Present Invention)

The following description discusses one embodiment of the present invention with reference to FIGS. 1 through 11. A display device (information processing device) 1 in accordance with the present embodiment is configured to receive, like a touch screen, an operation when a finger etc. (operation subject) makes contact with a display surface. The display device 1 is configured to also detect (i) a state in which the finger etc. (operation subject) is not in contact with the display surface but is close to the display surface (such a state is referred to as a hover state) and (ii) the position on the display surface which position is indicated by the finger etc. in the hover state (such a position is referred to as a hover position). The display device 1 is configured to ensure easy selection of objects in the following manner: upon detecting the hover state, the display device 1 displays an object selection guide(s) (object information) near the hover position, and, when a selection guide is selected, carries out the same process as a process that is to be carried out if an object corresponding to the object selection guide is selected.

Figure 2:
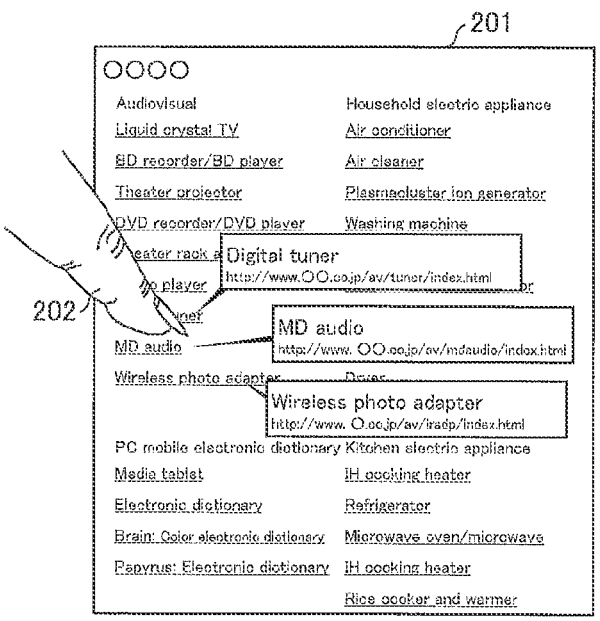
FIG. 2 illustrates a state in which selection guides are displayed on a display section of the display device.

FIG. 2 illustrates an example of a screen in which selection guides are displayed. In the display example 201 illustrated in FIG. 2, the selection guides for "digital tuner", "MD audio", and "wireless photo adapter", which are objects near the position of a finger 202, are displayed. In this example, text and URLs (uniform resource locators) are displayed as the selection guides.

This makes it possible to prevent the following problem: the objects "digital tuner", "MD audio", and "wireless photo adapter" are covered by the finger and a desired object is difficult to select and/or a different object is accidentally selected.

Figure 3:
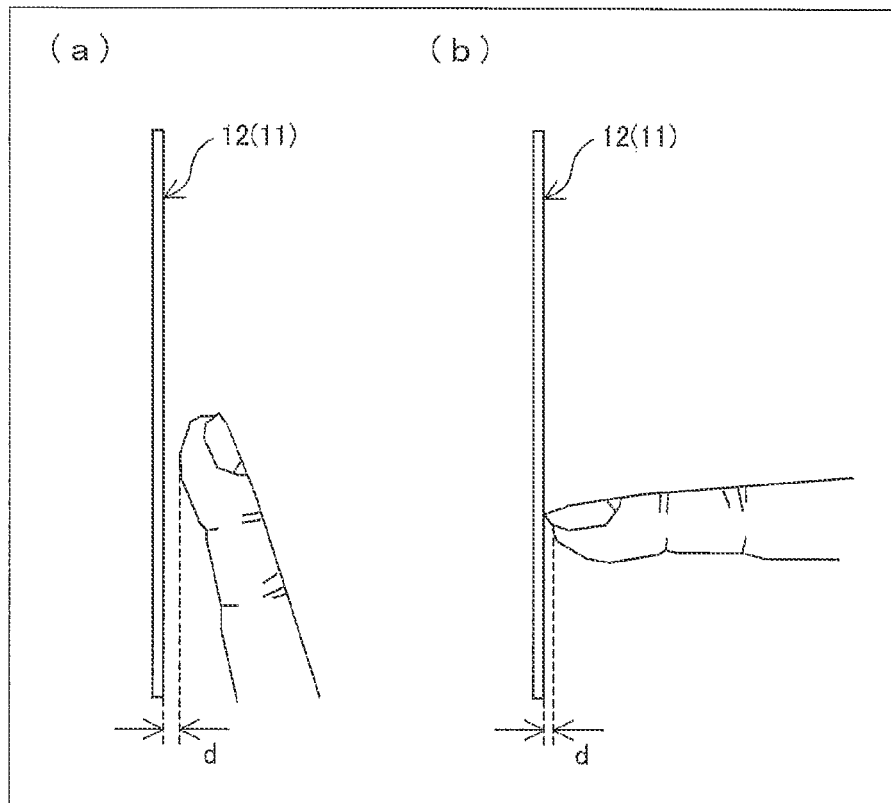
FIG. 3 describes a hover state.

Note, here, that the hover state means a state in which a target is within a predetermined distance from the display surface (operation screen) but is not in contact with the display surface. The following specifically describes the hover state with reference to FIG. 3. (a) and (b) of FIG. 3 each illustrate the hover state. In an example illustrated in (a) of FIG. 3, a finger is at a distance d from a display section 12. The state like this, i.e., the state in which a target (finger in this case) is within a predetermined distance from the display section 12 but is not in contact with the display section 12, is the hover state. In a case where the touch screen is a capacitive touch screen, an example illustrated in (b) of FIG. 3 is also the hover state. The example illustrated in (b) of FIG. 3 shows a state in which the finger is at the distance d from the display section 12 but the nail is in contact with the display section 12. Note that, when only the nail is in contact with the display section 12, it is easy to move the finger while in the hover state (see (b) of FIG. 3).

The following embodiments are described based on an example in which hyperlinked objects are displayed, but the present invention is not limited to such. A hyperlinked object means an object which, upon receiving an operation to select the object, obtains information of a hyperlink destination associated with the object and displays the hyperlink destination.

(Configuration of Display Device 1)

Figure 1:
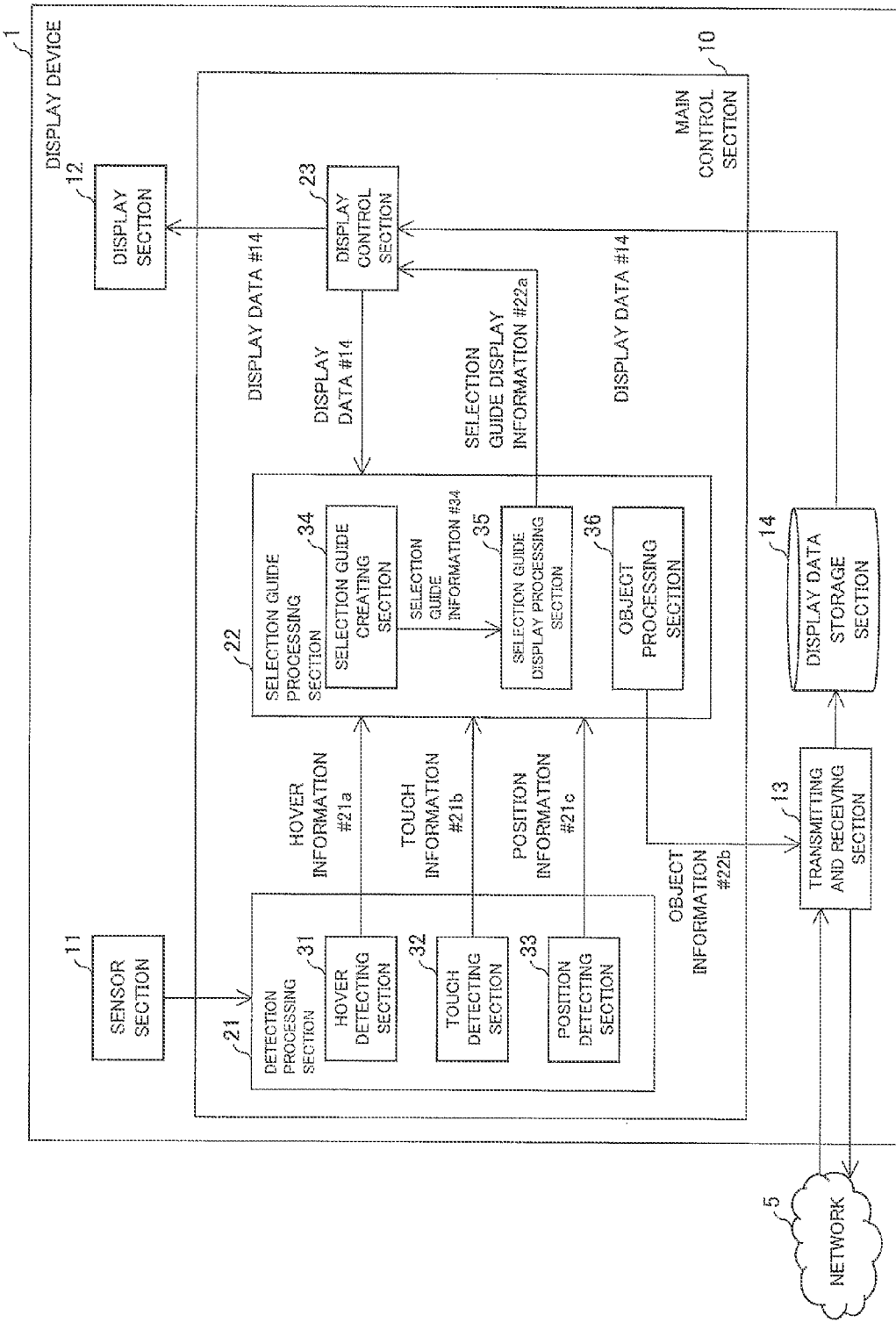
FIG. 1, which shows an embodiment of the present invention, is a block diagram illustrating a configuration of main parts of a display device.

First, a configuration of the display device 1 in accordance with the present embodiment is discussed with reference to FIG. 1. FIG. 1 is a block diagram illustrating a configuration of main parts of the display device 1.

As illustrated in FIG. 1, the display device 1 includes a main control section 10, a sensor section (detecting section) 11, a display section 12, a transmitting and receiving section 13, and a display data storage section 14.

The sensor section 11 is integrated with the display section 12. The sensor section 11 is configured to: detect (i) whether or not an operation receiving surface (display section 12) is touched, (ii) whether or not there is a target (which is in the hover state) near the operation receiving surface, and (iii) the touched position and/or the position of the target; and notify a detection processing section 21 of the results of the detection. The sensor section 11 and the display section 12 are constituted by a touch screen. The touch screen may be a capacitive touch screen or a combination of an optical sensor liquid crystal and a touch panel.

Whether or not there is a target in the hover state can be detected in the following manner. For example, in the case of a capacitive touch screen, it is possible to detect a target in the hover state by setting a detection threshold lower than the value obtained when the target is in contact with the touch screen but higher than the value obtained when the target is not at all detected. Alternatively, in the case of a combination of an optical sensor liquid crystal and a touch panel, it is possible to employ the following configuration: the touch panel is configured to detect whether or not the operation receiving surface is touched, and, when a target is detected by the optical sensor liquid crystal but no touch is detected by the touch panel, this state is regarded as the hover state.

The display section 12 is integrated with the sensor section 11. The display section 12 is configured to display various information such as display data. The transmitting and receiving section 13 transmits data and receives data via an external network 5.

The display data storage section 14 stores therein display data that is to be displayed on the display section 12.

The main control section 10 is configured to carry out various processes such as detection of a target, detection of a touch, and displaying of a selection guide, and includes a detection processing section 21, a selection guide processing section 22, and a display control section 23. The detection processing section 21 includes a hover detecting section 31, a touch detecting section 32, and a position detecting section 33. The selection guide processing section 22 includes a selection guide creating section (object detecting means) 34, a selection guide display processing section (object information display means) 35, and an object processing section (object processing means) 36.

The detection processing section 21 is configured to process the result of detection received from the sensor section 11. The hover detecting section 31 determines whether or not the target detected by the sensor section 11 is in the hover state, and, if it has determined that the target is in the hover state, notifies the selection guide processing section 22 of hover information #21a.

The touch detecting section 32 determines whether or not the target detected by the sensor section 11 is in contact with the operation receiving surface, and, if it has determined that the target is in contact with the operation receiving surface, notifies the selection guide processing section 22 of touch information #21b.

The position detecting section 33 detects (i) the position on the display section 12 which position is indicated by the operation subject in the hover state detected by the hover detecting section 31 and (ii) the position, on the display section 12, of the target in contact with the operation receiving surface which target is detected by the touch detecting section 32. Then, the position detecting section 33 notifies the selection guide processing section 22 of position information #21c which indicates the position thus detected.

The selection guide processing section 22 is configured to, for example, create, display, and delete selection guides. Upon receiving the hover information #21a from the hover detecting section 31, the selection guide creating section 34 detects an object(s) near the hover position by referring to (i) the position information #21c received from the position detecting section 33 and (ii) display data #14 received from the display control section 23. The selection guide creating section 34 then creates a selection guide(s) corresponding to the object(s) thus detected, and transmits, to the selection guide display processing section 35, selection guide information #34 which indicates the selection guide(s) thus created.

The selection guide display processing section 35 determines, by referring to the display data #14, a position(s) in which the selection guide(s) indicated by the selection guide information #34 received from the selection guide creating section 34 is/are to be displayed, and transmits, to the display control section 23, selection guide display information #22a which indicates selection guide information and the position(s) where the selection guide(s) is/are to be displayed.

In a case where a plurality of selection guides are to be displayed, the selection guide display processing section 35 determines positions where the respective selection guides are to be displayed. The selection guide display processing section 35 determines the positions so that the selection guides are displayed separately from each other and do not overlap their corresponding objects and in a more spread manner than their corresponding objects. The selection guides may be displayed larger than their corresponding objects.

The object processing section 36 judges, from the touch information #21b and the position information #21c, whether or not the position in which the target is in contact with the operation receiving surface (i.e., touch position) is the same as the position where selection guide information is displayed and, if it has judged that the touch position is the same as the position where selection guide information is displayed, carries out the same process as a process that is to be carried out when the object corresponding to the selection guide is selected. Then, in a case where the process that is to be carried out when the object is selected is a process to display a hyperlink destination associated with the object, the object processing section 36 transmits, to the transmitting and receiving section 13, object information #22b which indicates the hyperlink destination. The transmitting and receiving section 13 then obtains display data of the hyperlink destination via the network 5 and stores the display data in the display data storage section 14.

The display control section 23 causes the display section 12 to display (i) the display data #14 stored in the display data storage section 14 and (ii) the selection guide display information #22a received from the selection guide display processing section 35.

Sequence of Processes Performed on Display Device 1

Figure 4:
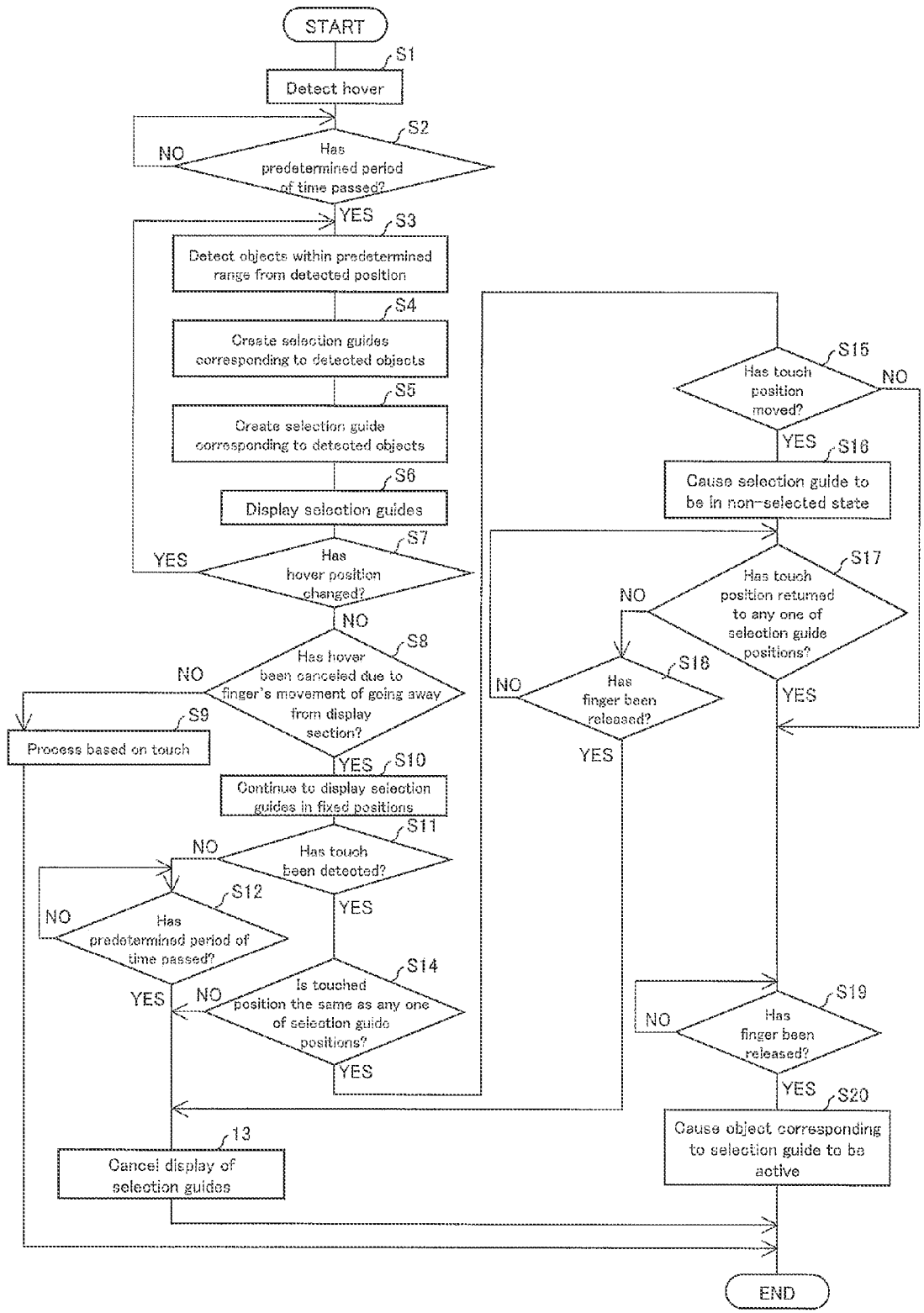
FIG. 4 is a flowchart showing a sequence of displaying selection guides and performing processes on the display device.

Next, a sequence of displaying selection guides and performing processes on the display device 1 is discussed with reference to FIG. 4. FIG. 4 is a flowchart showing the sequence of displaying selection guides and performing processes.

As shown in FIG. 4, on the display device 1, first, the hover detecting section 31 of the detection processing section 21 detects a hover state, and the position detecting section 33 of the detection processing section 21 specifies a hover position (S1: position specifying step). If the hover state continues longer than a predetermined period of time (YES in S2), the selection guide creating section 34 detects an object(s) that are within a predetermined range from the hover position (S3: object detecting step). The selection guide creating section 34 creates a selection guide(s) corresponding to the object(s) thus detected (S4), and the selection guide display processing section 35 determines the position(s) in which the selection guide(s) thus created by the selection guide creating section 34 is/are to be displayed (S5).

Then, the display control section 23 causes the selection guide(s) to be displayed in the position(s) determined by the selection guide display processing section 35 (S6: object information display step).

After that, if the position detecting section 33 has detected a change in the hover position (YES in S7), the process goes back to Step S3, and the selection guide creating section 34 creates a selection guide(s) corresponding to an object(s) within a predetermined range from the new hover position.

On the other hand, if (i) the position detecting section 33 has detected no change in the hover position (NO in S7), (ii) the hover detecting section 31 has detected no hover and (iii) the touch detecting section 32 has detected no touch (YES in S8), the display control section 23 fixes the position(s) of the selection guide(s) and continues to display the selection guide(s) (S10).

When the touch detecting section 32 has detected a touch to the display section 12 (YES in S11), the selection guide processing section 22 judges whether or not the touched position is the same as any of the position(s) of the selection guide(s) (S14). If it is judged that the touch position is the same as any of the position(s) of the selection guide(s) (S14), the selection guide display processing section 35 causes that selection guide to be in a selected state. Then, if the touched position remains the same as the position where the selection guide is displayed (YES in S15) and the touch has become no longer detected by the touch detecting section 32 (YES in S19), the object processing section 36 carries out a process associated with the object corresponding to the touched selection guide (S20: object processing step).

On the other hand, in Step S8, if the touch detecting section 32 has detected a touch (NO in S8) while the hover detecting section 31 is still detecting the hover state, the object processing section 36 carries out a process associated with the object in the touched position (S9). The process associated with the object in the touched position can be carried out by a known technique, and therefore the description thereof is omitted here.

In Step S11, if the touch detecting section 32 has detected no touch (NO in Step S11) and a predetermined period of time has passed (YES in S12), the selection guide display processing section 35 cancels the display of the selection guide(s) (S13).

In Step S14, if the touched position detected by the touch detecting section 32 is different from any of the position(s) where the selection guide(s) is/are displayed (NO in S14), the selection guide display processing section 35 cancels the display of the selection guide(s) (S13).

In Step S15, if the touch detecting section 32 has detected a state in which the touched position has moved out from the position where the selection guide is displayed (YES in S15), the selection guide display processing section 35 causes the selection guide displayed in the previously touched position to be in a non-selected state (S16). After that, if the touch detecting section 32 has detected a state in which the touched position has returned to any of position(s) where the selection guide(s) is/are displayed (YES in S17), the process proceeds to Step S19. On the other hand, if the touched position does not return to any of the position(s) where the selection guide(s) is/are displayed (NO in S17) and the touch has become no longer detected by the touch detecting section 32 (YES in S18), the selection guide display processing section 35 cancels the display of the selection guide(s) (S12).

The sequence of displaying selection guides and performing processes on the display device 1 have been described.

With the above arrangement, it is possible to display selection guides in such positions that are easy to select by hovering a finger, even in a case in which display data is small and the distance between adjacent objects is short. Furthermore, since the selection guides to aid selection are displayed, it is possible to select a desired object easily and unfailingly. Furthermore, since the selection guides are displayed instead of enlarged objects, browsability of the displayed objects is not reduced.

Furthermore, if the hover position has moved while in the hover state, selection guides for objects in a predetermined range from the new hover position are displayed. This makes it possible to display the selection guides easily even in a case where a different object is desired to be selected. For example, in a case where selection guides are displayed by a double tap etc., the double tap needs to be carried out again and this is troublesome. In this regard, with the above arrangement, such a troublesome operation can be avoided.

(Examples of Displayed Screens)

Figure 5:
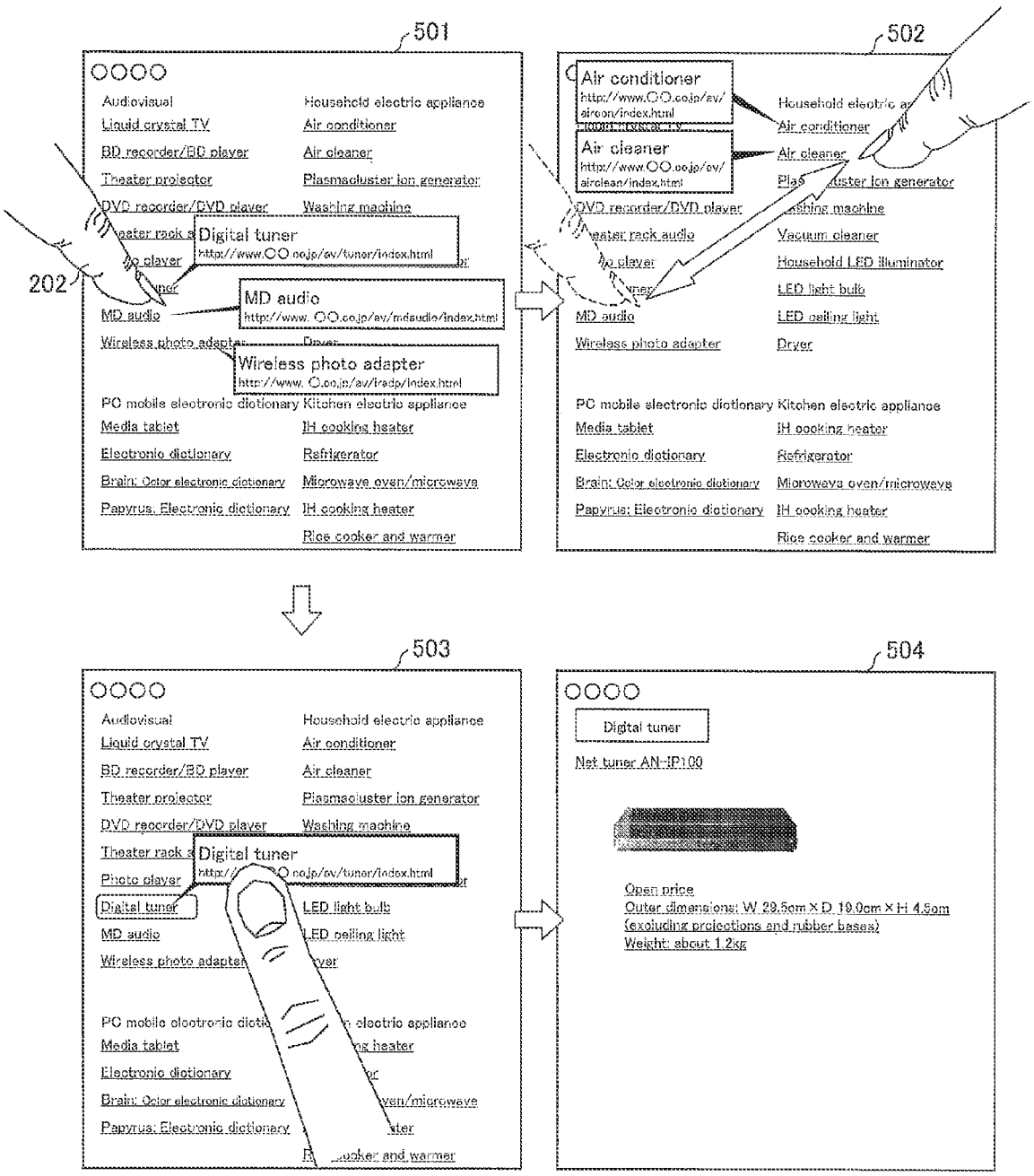
FIG. 5 illustrates examples of screens displayed on the display device.
Figure 7:
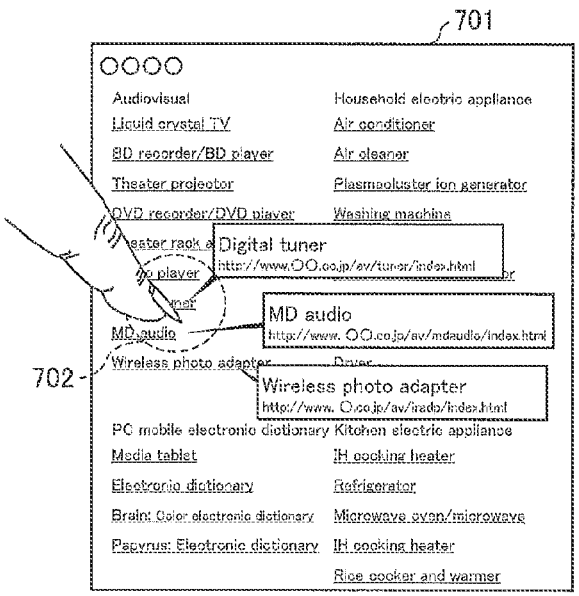
FIG. 7 illustrates a further example of a screen displayed on the display device.
Figure 8:
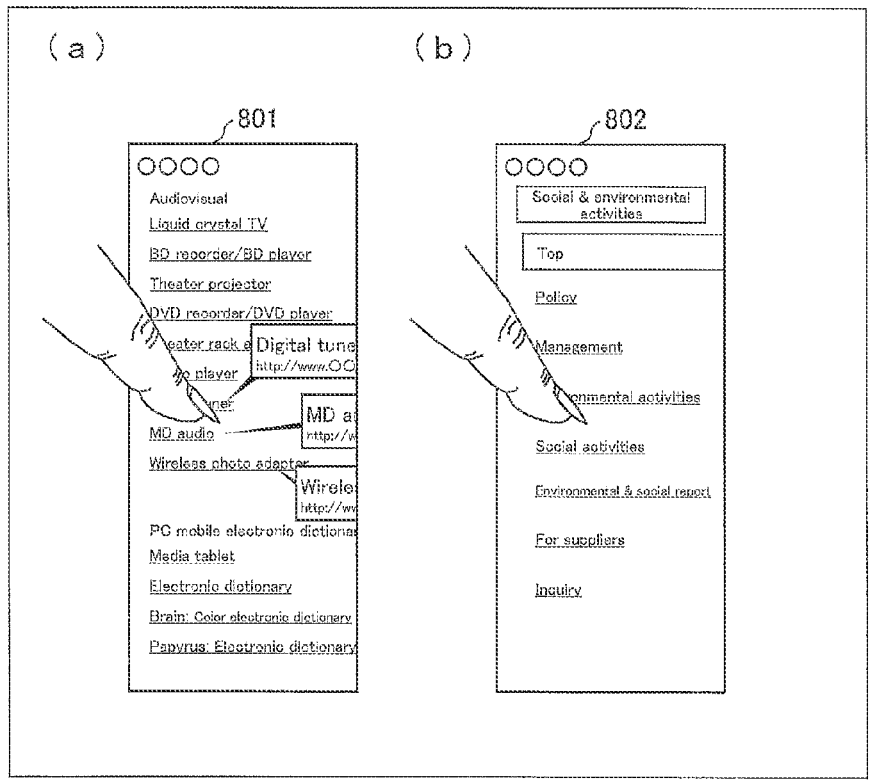
FIG. 8 also illustrates still further examples of screens displayed on the display device. (a) of FIG. 8 illustrates a case in which the distance between adjacent objects is short, and (b) of FIG. 8 illustrates a case in which the distance between adjacent objects is long.

Next, examples of screens displayed on the display section 12 are discussed with reference to FIGS. 5 and 6. FIGS. 5 and 6 illustrate examples of screens displayed when various process are performed on the display device 1.

A screen example 501 in FIG. 5 shows a state in which the hover detecting section 31 has detected a state in which a finger 202 is in the hover state and selection guides are displayed on the display section 12. This state corresponds to Step S6 of FIG. 4. In this state of the screen example 501, upon detecting a state in which the position of the finger 202 has moved while the finger is still in the hover state, the selection guide display processing section 35 displays, as illustrated in a screen example 502, selection guides corresponding to objects near the new hover position. In the screen example 502, the finger 202 before the movement is drawn in dashed lines, and the position of the finger 202 after the movement and the selection guides are drawn in solid lines.

Furthermore, in a case where the state of the screen example 501 is changed to a state in which the hover detecting section 31 detects no hover and the touch detecting section 32 detects no detection state, i.e., changed to a state in which the finger 202 is at a distance from the display section 12, and thereafter the touch detecting section 32 detects a touch to any one of the selection guides ("digital tuner" in this case), the selection guide display processing section 35 causes the touched selection guide to be in the selected state, and cancels the display of the other selection guide which is not touched (see screen example 503). In the screen example 503, the selection guide corresponding to the object "digital tuner" is touched. In this state of the screen example 503, in a case where the touch has become no longer detected by the touch detecting section 32, i.e., when the finger is released, the object processing section 36 carries out the same process as a process that is to be carried out when the object "digital tuner" is touched. A process to display a screen of "digital tuner" (screen example 504) is carried out here.

On the other hand, in a case where the state of the display example 503 is changed to a state in which the position detecting section 33 has detected a change in the touched position while the touch detecting section 32 is still detecting the touch, i.e., the position detecting section 33 has detected a movement of the finger while the finger is still in contact with the display section 12 (see FIG. 6), the selection guide display processing section 35 causes the selection guide in the selected state to be in the non-selected state (screen example 601).

(Other Examples of Displayed Screens)

Note that examples of screens displayed on the display section 12 also include the following. For example, as illustrated in a screen example 701 in FIG. 7, when the selection guides are displayed (like the screen example 501), a range may be displayed which indicates that selection guides corresponding to the objects within this range are currently displayed. The screen example 701 shows a state in which the selection guides for three objects included in a range 702 are displayed. It is also possible to employ a configuration in which, in a case where a finger moves while in the hover state, the range 702 also moves with the movement of the finger.

It is also possible to employ a configuration in which selection guides are displayed only in a case where the distance between adjacent objects is smaller than a predetermined value. For example, it is possible to employ a configuration in which (i) in the case where the distance between adjacent objects is smaller than the predetermined value as illustrated in a screen example 801 in (a) of FIG. 8, selection guides are displayed and (ii) in a case where the distance between adjacent objects is larger than the predetermined value as illustrated in a screen example 802 in (b) of FIG. 8, no selection guide is displayed.

Figure 9:
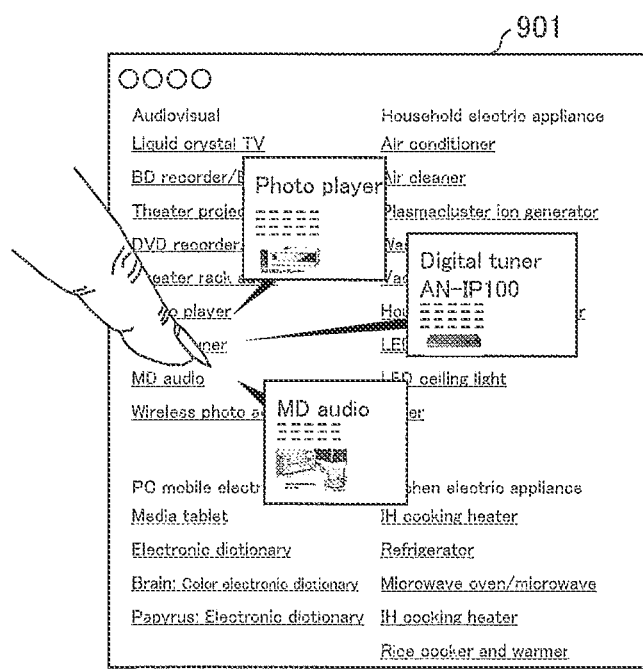
FIG. 9 illustrates still yet a further example of a screen displayed on the display device.

A selection guide may be data of a hyperlink destination in thumbnail view, instead of the address of the hyperlink destination. A screen example 901 in FIG. 9 is an example in which thumbnail images are displayed as selection guides. The thumbnail images to be displayed may be generated by obtaining data of a hyperlink destination. Alternatively, an arbitrary image obtained from the hyperlink destination may be displayed as it is.

Furthermore, it is possible to employ a configuration in which a user can select in what form a selection guide is to be displayed.

(Additional Remarks 1)

Figure 10:
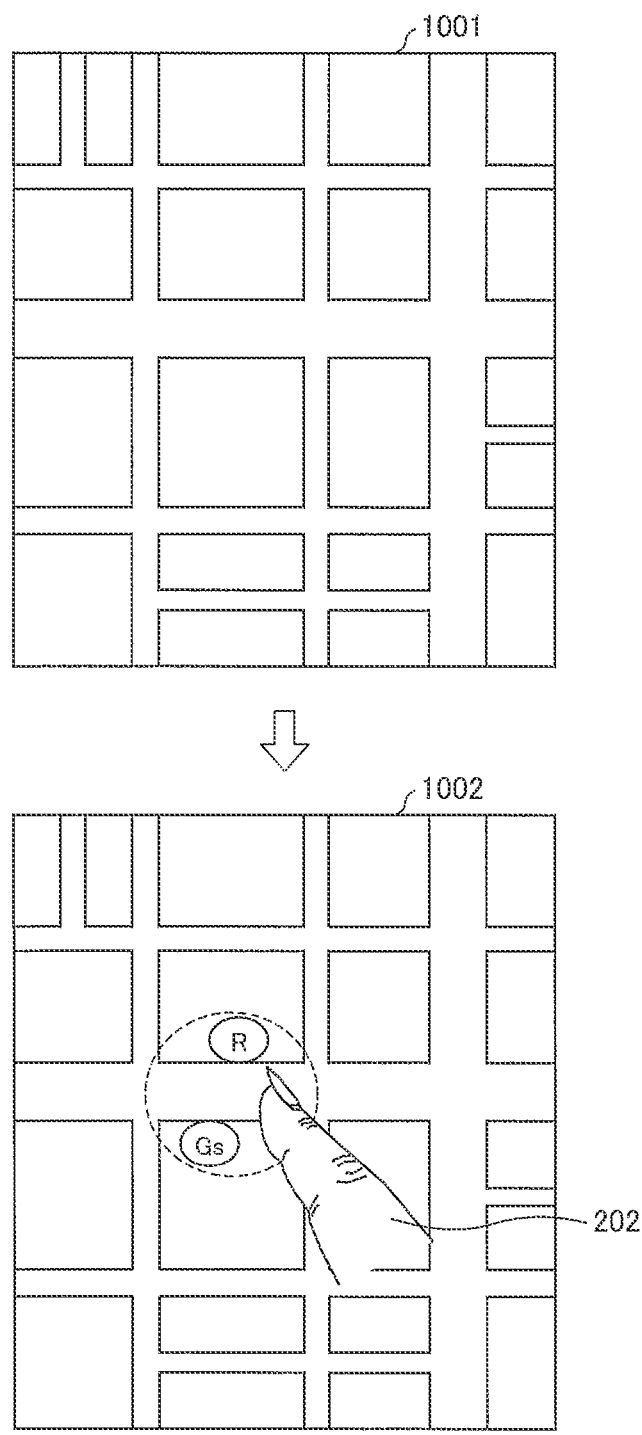
FIG. 10 illustrates an example in which a map is displayed.
Figure 11:
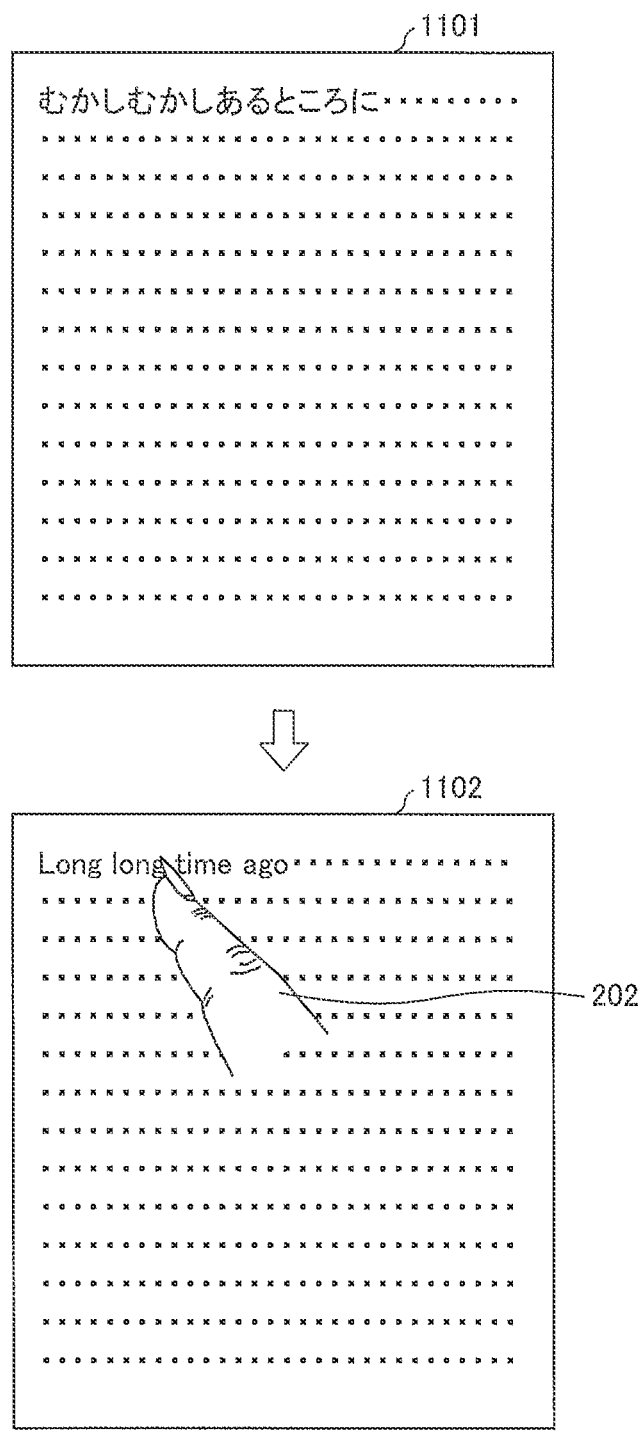
FIG. 11 illustrates an example in which text is displayed.

The above embodiment discussed a case where display data is a hyperlinked object. However, the present invention is not limited to such. For example, it is possible to employ a configuration in which display data is a map on which, when a finger etc. hovers over it, pieces of information such as those of restaurants and gas stations etc. are displayed near a hover position. This is described with reference to FIG. 10. A screen example 1001 in FIG. 10 is an example in which a map is displayed on the display section 12. In this screen example 1001, when a hover state is detected, a restaurant ("R" in a screen example 1002) and a gas station ("Gs" in the screen example 1002) which are within a predetermined range from the hover position thus detected are displayed (screen example 1002).

Facilities to be displayed are not limited to restaurants or gas stations, and may be any facilities such as, for example, convenience stores, banks, police stations.

Furthermore, it is also possible to employ a configuration in which a user can select what facilities to display.

Alternatively, it is possible to employ a configuration in which only a region within a predetermined range from the hover position on a map is changed to an aerial photograph, or in which a region within a predetermined range from the hover position is enlarged.

(Additional Remarks 2)

Alternatively, it is possible to employ a configuration in which, in a case where text is displayed on the display section 12, text within a predetermined range from a hover position is translated into another language. This is described with reference to FIG. 11. As illustrated in a screen example 1101 in FIG. 11, when a hover state is detected while Japanese text is displayed, Japanese text within a predetermined range from the hover position thus detected is translated into English and the English translation is displayed (screen example 1102).

Note that the translation is not limited to translation from Japanese into English, and may be translation of any language. It is also possible to employ a configuration in which, in addition to translation, the meaning or explanation of a word included in the hover position is displayed.

The present invention is not limited to the foregoing embodiment, but rather can be applied in many variations within the scope of the claims. That is, an embodiment obtained from a proper combination of technical means within the scope of the claims is also included in technical scope of the present invention.

(Others)

The present invention can also be described as below. That is, an information processing device in accordance with the present invention is an information processing device configured to carry out a process(es) associated with a displayed object(s) selected from a plurality of displayed objects, said information processing device being configured to carry out the process(es) associated with the displayed object(s) upon detecting a touch to the displayed object(s) with an operation subject, said information processing device including: a detecting section for detecting a hover state in which the operation subject is not in contact with a display surface but is within a predetermined distance from the display surface; position specifying means for specifying, when the detecting section has detected the hover state, a position on the display surface which position is indicated by the operation subject thus detected; object detecting means for detecting a plurality of objects which are displayed within a predetermined range from the position specified by the position specifying means; object information display means for displaying pieces of object information corresponding to the respective plurality of objects detected by the object detecting means so that the pieces of object information are displayed in a more spread manner than the plurality of objects detected by the object detecting means; and object processing means for carrying out, upon detecting a touch to any of the pieces of object information displayed by the object information display means, the same process(es) as a process(es) that is/are to be carried out if an object(s) corresponding to the any of the pieces of object information is/are selected.

A method for controlling an information processing device in accordance with the present invention is a method for controlling an information processing device configured to carry out a process(es) associated with a displayed object(s) selected from a plurality of displayed objects, the information processing device being configured to carry out the process(es) associated with the displayed object(s) upon detecting a touch to the displayed object(s) with an operation subject, the information processing device including a detecting section for detecting a hover state in which the operation subject is not in contact with a display surface but is within a predetermined distance from the display surface, said method including the steps of: (a) specifying, when the detecting section has detected the hover state, a position on the display surface which position is indicated by the operation subject thus detected; (b) detecting a plurality of objects which are displayed within a predetermined range from the position specified in step (a); (c) displaying pieces of object information corresponding to the respective plurality of objects detected in step (b) so that the pieces of object information are displayed in a more spread manner than the plurality of objects detected in step (b); and (d) carrying out, upon detecting a touch to any of the pieces of object information displayed in step (c), the same process(es) as a process(es) that is/are to be carried out if an object(s) corresponding to the any of the pieces of object information is/are selected.

With the arrangement or the method, when the detecting section has detected the hover state of the operation subject, the pieces of object information corresponding to the respective plurality of objects displayed within the predetermined range from the position on the display surface which position is indicated by the operation subject are displayed.

The pieces of object information are displayed in a more spread manner than their corresponding plurality of objects, and, when a touch to any of the pieces of object information is detected, the same process(es) as a process(es) associated with an object(s) corresponding to the any of the pieces of object information is/are carried out.

With this arrangement, when the operation subject is in the hover state, pieces of object information corresponding to the objects near the hover position are displayed in a more spread manner than the objects. This allows a user to select a piece of object information corresponding to a desired object easily and unfailingly. In other words, it is possible for the user to select a piece of object information easily and unfailingly.

Accordingly, even in a case where small objects are displayed close together, it is possible to allow a user to select a desired object easily and unfailingly.

Note, here, that the predetermined range can be, for example, a range which is covered by a finger when the display surface is touched with the finger. Furthermore, the operation subject can be, for example, a user's finger or a stylus.

The information processing device in accordance with the present invention can also be configured such that, when the position specified by the position specifying means has changed to another position while the detecting section is still detecting the hover state, the object detecting means detects another plurality of objects which are displayed within a predetermined range from the another position; and the object information display means displays pieces of object information corresponding to the another plurality of objects detected by the object detecting means after the position has changed to the another position.

With this arrangement, if the position has changed to another position while the operation subject is still in the hover state, pieces of object information corresponding to the another position are displayed. This makes it possible, even in a case where a different object is desired to be selected, to easily present to a user a piece of object information corresponding to the new desired object.

The information processing device in accordance with the present invention can also be configured such that the object information display means continues to display the pieces of object information even if, after the object information display means has started displaying the pieces of object information, the hover state becomes no longer detected by the detecting section.

With this arrangement, the object information display means continues to display the pieces of object information even if, after starting the display of the pieces of object information, the hover state becomes no longer detected by the detecting section. This makes it possible for a user to select a piece of object information even if the operation subject is temporarily released from the display surface for the selection of the object information.

The information processing device in accordance with the present invention can also be configured such that the object information display means displays the pieces of object information in a case where a distance between adjacent ones of the plurality of objects detected by the object detecting means is equal to or less than a predetermined value.

If objects are displayed at some distances from each other, it is easy to directly select an object. According to the arrangement, the pieces of object information are displayed in the case where the distance between adjacent ones of the plurality of objects is equal to or less than the predetermined value. This makes it possible to display the pieces of object information only in a case where objects are difficult to select.

Note, here, that the predetermined value can be, for example, a value equivalent to the size of a finger.

The information processing device in accordance with the present invention can also be configured such that the object information display means displays, along with the pieces of object information, range information which indicates the predetermined range within which the object detecting means carries out the detection of objects.

With this arrangement, a range is displayed which indicates that, for the objects within this range, their corresponding pieces of object information are displayed. This makes it possible to clearly present to a user a range which indicates that, for the objects within this range, their corresponding pieces of object information are displayed.

The information processing device in accordance with the present invention can also be configured such that the process(es) associated with the object(s) is/are to display, when the object(s) is/are selected, display data of a hyperlink destination(s) associated with the object(s); and the object information display means is configured to display, as the object information, a name(s) of the hyperlink destination(s) associated with the object(s) and a locations(s) where the hyperlink destination(s) associated with the object(s) is/are stored.

With this arrangement, the name(s) of the hyperlink destination(s) associated with the object(s) and the locations(s) where the hyperlink destination(s) associated with the object(s) is/are stored are displayed as the object information. This allows a user to recognize the name(s) of the hyperlink destination(s) which is/are to be displayed when the object(s) is/are selected and the locations(s) where the hyperlink destination(s) associated with the object(s) is/are stored.

The information processing device in accordance with the present invention can also be configured such that the process(es) associated with the object(s) is/are to display, when the object(s) is/are selected, display data of a hyperlink destination(s) associated with the object(s); and the object information display means is configured to display, as the object information, a thumbnail image(s) indicative of an overview(s) of the display data of the hyperlink destination(s) associated with the object(s).

With this arrangement, the thumbnail image(s) indicative of the overview(s) of the display data of the hyperlink destination(s) associated with the object(s) is/are displayed as the object information. This allows a user to recognize the overview(s) of the display data which is/are to be displayed when the object(s) is/are selected.

The information processing device may be realized by a computer. In this case, the present invention encompasses: a control program for the information processing device which program causes a computer to operate as each means of the information processing device so that the information processing device can be realized by the computer; and a computer-readable recording medium in which the information processing device control program is stored.

(Software Implementation)

Lastly, each block of the display device 1, especially the main control section 10 (the hover detecting section 31, the touch detecting section 32, the position detecting section 33 of the detection processing section 21; the selection guide creating section 34, the selection guide display processing section 35 and the object processing section 36 of the selection guide processing section 22; and the display control section 23) may be realized by a logic circuit (hardware provided in an integrated circuit (IC chip) or software as executed by a CPU (central processing unit)).

In the latter case, the display device 1 includes a CPU and memory devices (recording media). The CPU executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the display device 1 a computer-readable recording medium containing control program code (executable program, intermediate code program, or source program) for the display device 1, which is software realizing the aforementioned functions, in order for the computer (or CPU, MPU (micro processing unit)) to retrieve and execute the program code contained in the recording medium.

The recording medium may be, for example, a tape, such as a magnetic tape or a cassette tape; a magnetic disk, such as a Floppy (Registered Trademark) disk or a hard disk, or an optical disk, such as CD-ROM (compact disc read-only memory)/MO (magneto-optical)/MD (Mini Disc)/DVD (digital versatile disk)/CD-R (CD Recordable); a card, such as an IC card (memory card) or an optical card; a semiconductor memory, such as a mask ROM/EPROM (erasable programmable read-only memory)/EEPROM (Registered Trademark) (electrically erasable and programmable read-only memory)/flash ROM; or a logic circuit, such as a PLD (Programmable logic device) and a FPGA (Field Programmable Gate Array).

The display device 1 may be arranged to be connectable to a communications network so that the program code may be made available over the communications network. The communications network is not limited in any particular manner provided that it enables the transmission of the program code. The communications network may be, for example, the Internet, an intranet, extranet, LAN (local area network), ISDN (integrated services digital network), VAN (value-added network), CATV (community antenna television) communications network, virtual dedicated network (virtual private network), telephone line network, mobile communications network, or satellite communications network. The transfer medium which makes up the communications network is not limited in any particular manner, provided that it enables transmission of the program code. The transfer medium may be, for example, wired line, such as IEEE (institute of electrical and electronic engineers) 1394, USB, electric power line, cable TV line, telephone line, or ADSL (asynchronous digital subscriber loop) line; or wireless, such as infrared radiation (IrDA (infrared data association), remote control), Bluetooth (Registered Trademark), IEEE802.11 wireless, HDR (high data rate), NFC (Near Field Communication), DLNA (Digital Living Network Alliance), mobile telephone network, satellite line, or terrestrial digital network. Note that the present invention can also be implemented by the program in the form of a computer data signal embedded in a carrier wave which is embodied by electronic transmission.

INDUSTRIAL APPLICABILITY

The present invention makes it possible, in a display device in which a process is to be carried out via a touch to a screen, to more easily select displayed data. Therefore, the present invention is suitably applicable to a display device with a small display screen, for example, a potable display device.

REFERENCE SIGNS LIST

1 Display device (information processing device)
11 Sensor section (detecting section)
33 Position detecting section (position specifying means)
34 Selection guide creating section (object detecting means)
35 Selection guide display processing section (object information display means)
36 Object processing section (object processing means)
202 Finger (operation subject)

The invention claimed is:

1. An information processing device configured to carry out a process(es) associated with a displayed object(s) selected from a plurality of displayed objects, said information processing device being configured to carry out the process(es) associated with the displayed object(s) upon detecting a touch to the displayed object(s) with an operation subject,
said information processing device comprising:
a detecting section for detecting a hover state in which the operation subject is not in contact with a display surface but is within a predetermined distance from the display surface;
position specifying means for specifying, when the detecting section has detected the hover state, a position on the display surface which position is indicated by the operation subject thus detected;
object detecting means for detecting a plurality of objects which are displayed within a predetermined range from the position specified by the position specifying means;
object information display means for displaying pieces of object information corresponding to the respective plurality of objects detected by the object detecting means so that the pieces of object information are displayed in a more spread manner and larger than the plurality of objects detected by the object detecting means and at positions at which each of the pieces of object information does not overlap a corresponding one of the plurality of objects; and
object processing means for carrying out, upon detecting a touch to any of the pieces of object information displayed by the object information display means, the same process(es) as a process(es) that is/are to be carried out if an object(s) corresponding to the any of the pieces of object information is/are selected.

2. The information processing device as set forth in claim 1, wherein:
when the position specified by the position specifying means has changed to another position while the detecting section is still detecting the hover state, the object detecting means detects another plurality of objects which are displayed within a predetermined range from the another position; and
the object information display means displays pieces of object information corresponding to the another plurality of objects detected by the object detecting means after the position has changed to the another position.

3. The information processing device as set forth in claim 1, wherein the object information display means continues to display the pieces of object information even if, after the object information display means has started displaying the pieces of object information, the hover state becomes no longer detected by the detecting section.

4. The information processing device as set forth in claim 1, wherein the object information display means displays the pieces of object information in a case where a distance between adjacent ones of the plurality of objects detected by the object detecting means is equal to or less than a predetermined value.

5. The information processing device as set forth in claim 1, wherein the object information display means displays, along with the pieces of object information, range information which indicates the predetermined range within which the object detecting means carries out the detection of objects.

6. The information processing device as set forth in claim 1, wherein:
the process(es) associated with the object(s) is/are to display, when the object(s) is/are selected, display data of a hyperlink destination(s) associated with the object(s); and
the object information display means is configured to display, as the object information, a name(s) of the hyperlink destination(s) associated with the object(s) and a locations(s) where the hyperlink destination(s) associated with the object(s) is/are stored.

7. The information processing device as set forth in claim 1, wherein:
the process(es) associated with the object(s) is/are to display, when the object(s) is/are selected, display data of a hyperlink destination(s) associated with the object(s); and
the object information display means is configured to display, as the object information, a thumbnail image(s) indicative of an overview(s) of the display data of the hyperlink destination(s) associated with the object(s).

8. A non-transitory computer-readable recording medium in which an information processing device control program, for causing an information processing device as set forth in claim 1 to operate, the information processing device control program causing a computer to function as each means of the information processing device is stored.

9. A method for controlling an information processing device configured to carry out a process(es) associated with a displayed object(s) selected from a plurality of displayed objects, the information processing device being configured to carry out the process(es) associated with the displayed object(s) upon detecting a touch to the displayed object(s) with an operation subject, the information processing device including a detecting section for detecting a hover state in which the operation subject is not in contact with a display surface but is within a predetermined distance from the display surface, said method comprising the steps of:

(a) specifying, when the detecting section has detected the hover state, a position on the display surface which position is indicated by the operation subject thus detected;

(b) detecting a plurality of objects which are displayed within a predetermined range from the position specified in step (a);

(c) displaying pieces of object information corresponding to the respective plurality of objects detected in step (b) so that the pieces of object information are displayed in a more spread manner and larger than the plurality of objects detected in step (b) and at positions at which each of the pieces of object information does not overlap a corresponding one of the plurality of objects; and (d) carrying out, upon detecting a touch to any of the pieces of object information displayed in step (c), the same process(es) as a process(es) that is/are to be carried out if an object(s) corresponding to the any of the pieces of object information is/are selected.

* * * * *